US007536244B2

(12) United States Patent
Kunihiro et al.

(10) Patent No.: US 7,536,244 B2
(45) Date of Patent: May 19, 2009

(54) FAILURE DIAGNOSTIC APPARATUS AND METHOD FOR AN AIR-FUEL RATIO SENSOR

(75) Inventors: Mitsuyasu Kunihiro, Tokyo (JP); Koji Nishimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 179 days.

(21) Appl. No.: 10/895,894

(22) Filed: Jul. 22, 2004

(65) Prior Publication Data

US 2005/0131601 A1 Jun. 16, 2005

(30) Foreign Application Priority Data

Dec. 11, 2003 (JP) .......................... P2003-413674

(51) Int. Cl.
*G06F 19/00* (2006.01)
*G06F 17/00* (2006.01)
*F02D 41/00* (2006.01)

(52) U.S. Cl. .......................... 701/34; 701/29; 701/100; 701/103; 701/104; 701/105; 701/106; 701/107; 701/108; 701/109; 123/479; 123/672; 123/685; 123/688; 123/690

(58) Field of Classification Search .................. 701/29, 701/99, 34, 100–109; 123/674, 685–690, 123/693, 694
See application file for complete search history.

(56) References Cited

U.S. PATENT DOCUMENTS 5,020,499 A * 6/1991 Kojima et al. ............... 123/479
5,209,206 A * 5/1993 Danno et al. ................ 123/479
5,255,554 A * 10/1993 Mallebrein et al. ......... 73/23.32
5,298,865 A * 3/1994 Denz et al. .................. 324/509
5,461,569 A * 10/1995 Hara et al. .................. 701/101
5,685,284 A * 11/1997 Nakamichi .................. 123/688
6,136,169 A * 10/2000 Okamoto .................... 204/401
6,818,120 B2 * 11/2004 Nakamichi et al. ....... 205/784.5
6,912,887 B2 * 7/2005 Ikeda ......................... 73/1.06
6,976,382 B2 * 12/2005 Kadowaki et al. ............ 73/1.06
2002/0175086 A1 11/2002 Nakamichi et al.
2004/0100271 A1 * 5/2004 Ikeda ......................... 324/514

FOREIGN PATENT DOCUMENTS

JP 5-107299 A 4/1993
JP 5-223776 A 8/1993
JP 2002-349329 A 12/2002

* cited by examiner

*Primary Examiner*—Jack W. Keith
*Assistant Examiner*—Chuong P Nguyen
(74) *Attorney, Agent, or Firm*—Sughrue Mion, PLLC

(57) ABSTRACT

A failure diagnostic apparatus is provided with an offset power source for offsetting a ground-side voltage of an air-fuel ratio sensor, an activation state judging unit for judging whether the air-fuel ratio sensor is active, a failure diagnosing unit for judging for a failure from an offset-added output signal of the air-fuel ratio sensor in a period when the activation state judging unit judges that the air-fuel ratio sensor is active, an input resistance switching unit for switching the level of an input signal from the air-fuel ratio sensor when the failure diagnosing unit has detected a failure in the air-fuel ratio sensor, and a failure state judging unit for determining a type of failure of the air-fuel ratio sensor on the basis of a voltage level obtained when the input resistance switching unit has switched the input signal level.

6 Claims, 6 Drawing Sheets

FAILURE DIAGNOSTIC APPARATUS AND METHOD FOR AN AIR-FUEL RATIO SENSOR

BACKGROUND OF THE INVENTION

1. Field of the Invention

The present invention relates to an diagnostic apparatus and method for performing a failure diagnosis on an air-fuel ratio sensor that is used for feedback-controlling the air-fuel ratio of an internal combustion engine.

2. Description of the Related Art

To detect an air-fuel ratio of an internal combustion engine and control a fuel supply amount or the like by feeding back the detected air-fuel ratio, an exhaust pipe is provided with an $O_2$ sensor as an air-fuel ratio sensor for detecting an $O_2$ concentration of exhaust gas. Vehicles are equipped with a failure diagnostic apparatus for detecting a possible failure in the air-fuel ratio sensor on the basis of its output voltage. The $O_2$ sensor is disadvantageous in that it is difficult to discriminate between a disconnection of a signal line and a ground fault at the occurrence of a failure because the internal resistance of the $O_2$ sensor is very high and its output voltage is low until it heats and reaches an active state and its output voltage is small in a lean state even after its activation. In view of this, various techniques have been proposed to detect a possible failure in an air-fuel ratio sensor ($O_2$ sensor).

JP-A-2002-349329 (pages 3 and 4 and FIGS. 1-3) discloses a failure diagnostic apparatus that continuously judges whether a disconnection state or a ground fault has occurred. An activation state of an air-fuel ratio sensor is judged. When the air-fuel ratio sensor is inactive, a voltage is measured after switching the input resistance of an input circuit for signal input from the air-fuel ratio sensor to an ECU.

JP-A-5-107299 (pages 3-5 and FIGS. 3 and 4) discloses a technique that ground-side voltages of air-fuel ratio sensors disposed before and behind a catalyst are offset by a prescribed value to the ground voltage and the offset-added sensor output voltages are measured, whereby a possible disconnection or short-circuiting is detected continuously while the air-fuel ratio sensors are active without changing the composition of an air-fuel mixture.

JP-A-05-223776 (pages 3-5 and FIGS. 3 and 4) discloses a technique that high-potential-side of air-fuel ratio sensors disposed before and behind a catalyst is offset (increased) to a prescribed potential and low-potential-side signals are input to a microprocessor via respective amplifiers and A/D converters, whereby various kinds of possible trouble such as a disconnection and short-circuiting to the ground or a battery of a sensor connection circuit are detected continuously while the air-fuel ratio sensors are active without changing the composition of an air-fuel mixture.

Among the above techniques for detecting a possible failure in an air-fuel ratio sensor, the technique of JP-A-2002-349329 has problems that it enables failure detection only while the air-fuel ratio sensors are inactive (i.e., failure detection cannot be performed unless the air-fuel ratio sensor is in an inactive state) and that it cannot perform failure detection continuously. The failure diagnostic apparatus of JP-A-5-107299 has problems that it is difficult to discriminate between a disconnection of a signal line of the air-fuel ratio sensors and a ground fault, that is, a type of failure cannot be judged correctly. Although the technique of JP-A-05-223776 enables a failure judgment to be performed correctly and continuously, it requires a circuit for outputting the difference between an offset-added high-potential-side output voltage and a low-potential-side output voltage of each air-fuel ratio sensor and a parallel circuit that depends on the characteristic of the air-fuel ratio sensors. As a result, a failure detection circuit that is part of a system is complicated and hence is necessarily expensive.

SUMMARY OF THE INVENTION

The present invention has been made to solve the above problems, and an object of the invention is therefore to provide a failure diagnostic apparatus and method for an air-fuel ratio sensor capable of making the configuration of a failure detection circuit simpler and performing a failure diagnosis continuously and more correctly.

A failure diagnostic apparatus for an air-fuel ratio sensor according to the invention comprises an air-fuel ratio sensor attached to an exhaust pipe of an internal combustion engine, for detecting an air-fuel ratio from an oxygen concentration of exhaust gas; an offset power source for offsetting a ground-side voltage of the air-fuel ratio sensor; activation state judging means for judging whether the air-fuel ratio sensor is active; failure diagnosing means for judging for a failure from an offset-added output signal of the air-fuel ratio sensor in a period when the activation state judging means judges that the air-fuel ratio sensor is active; input resistance switching means for switching a level of an input signal from the air-fuel ratio sensor when the failure diagnosing means has detected a failure in the air-fuel ratio sensor; and failure state judging means for determining a type of failure of the air-fuel ratio sensor on the basis of a voltage level obtained when the input resistance switching means has switched the input signal level.

A failure diagnostic method for an air-fuel ratio sensor according to the invention comprises the steps of an offset power source's offsetting a ground-side voltage of the air-fuel ratio sensor that is attached to an exhaust pipe of an internal combustion engine and detects an air-fuel ratio from an oxygen concentration of exhaust gas, an offset voltage being set higher than a maximum output voltage of the air-fuel ratio sensor by a prescribed voltage; failure diagnosing means's judging for a failure by reading an offset-added output signal of the air-fuel ratio sensor in a period when the air-fuel ratio sensor is active; switching a level of an input signal from the air-fuel ratio sensor by switching an input resistance when the failure diagnosing means has detected a failure in the air-fuel ratio sensor; and failure state judging means for determining whether the air-fuel ratio sensor is in a disconnection state or a ground fault state on the basis of a voltage level of the switched input signal.

The above-described failure diagnosing apparatus and method for an air-fuel ratio sensor make it possible to detect a possible failure continuously from an output signal of the air-fuel ratio sensor while the air-fuel ratio sensor is active, and thereby enable early detection of a failure. Further, since a voltage level is detected by switching the input resistance with the input resistance switching means, whether the type of failure is a disconnection or a ground fault can be judged correctly. Early detection of a failure and determination of a type of failure are enabled merely by adding simple circuits.

DESCRIPTION OF THE PREFERRED EMBODIMENTS

Figure 1:
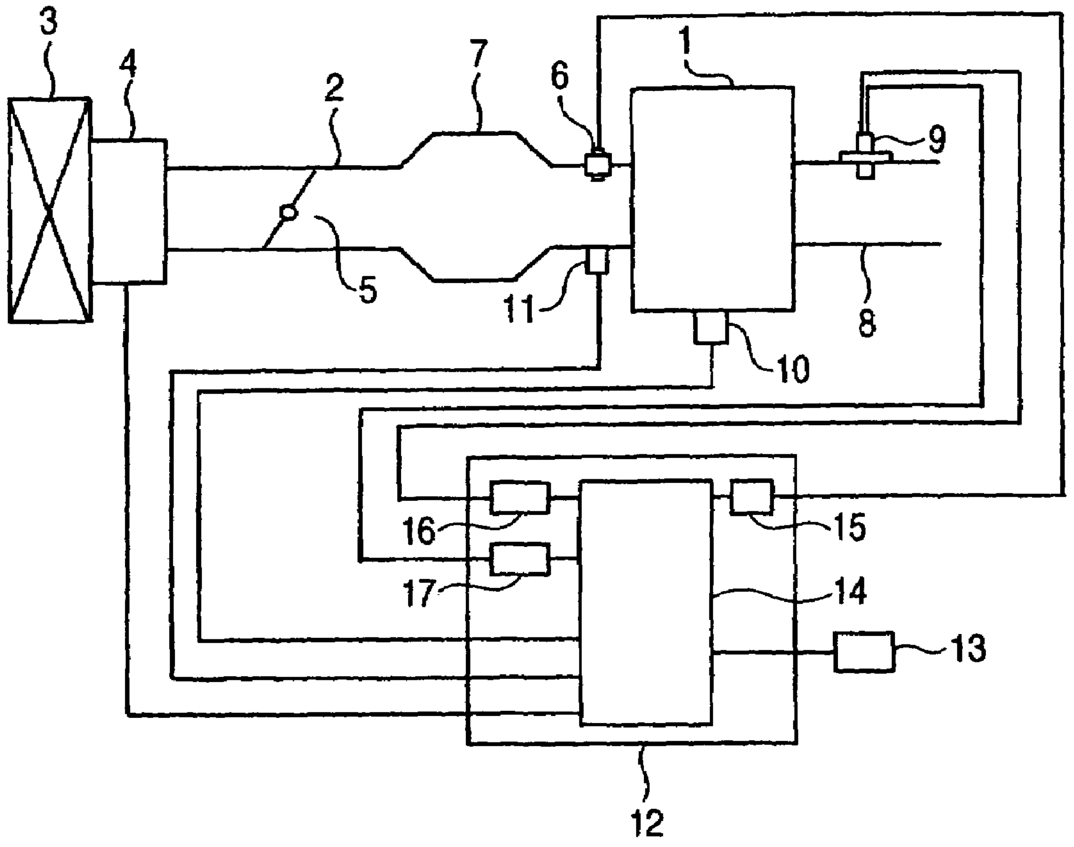
FIG. 1 schematically shows the entire configuration of an internal combustion engine including a failure diagnostic apparatus for an air-fuel ratio sensor according to an embodiment of the present invention.
Figure 2:
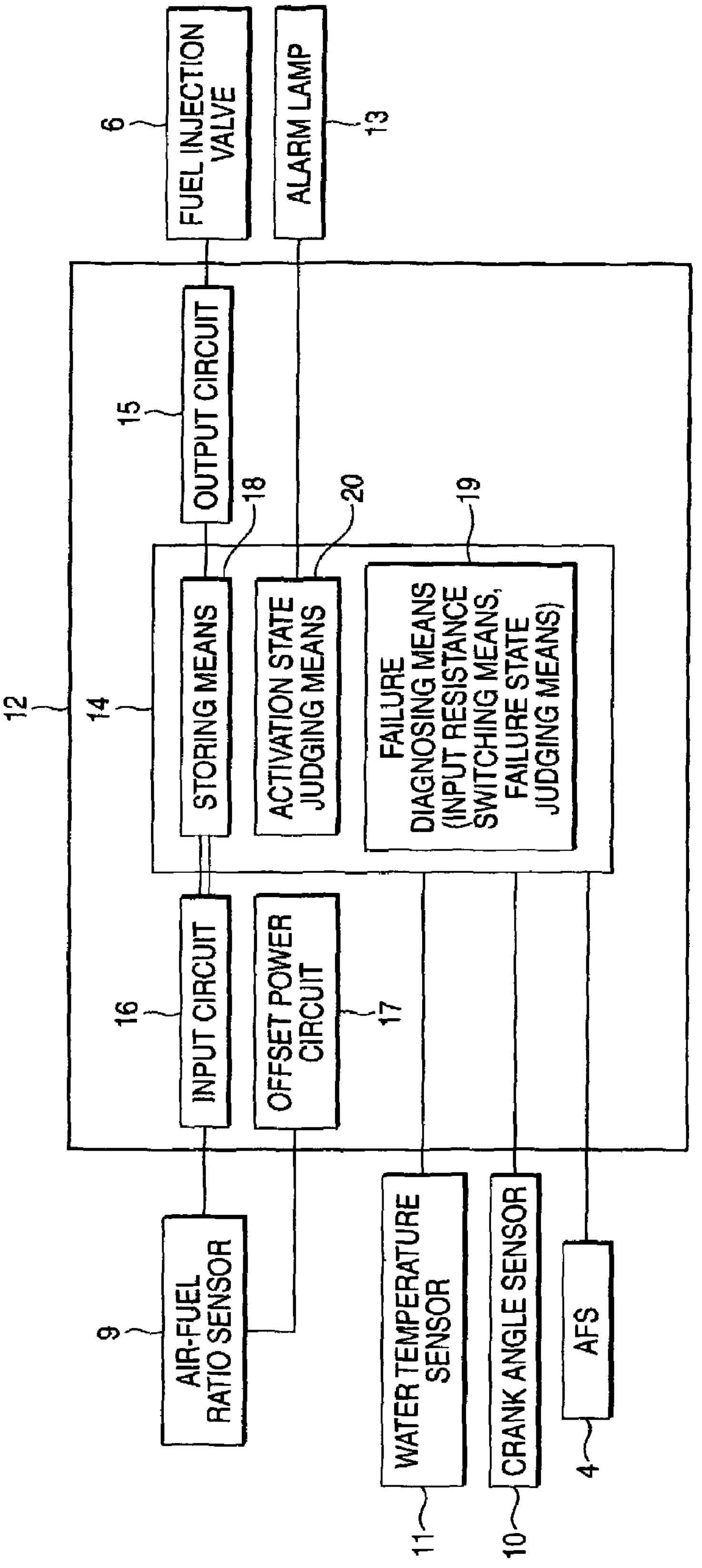
FIG. 2 is a functional block diagram of the failure diagnostic apparatus for an air-fuel ratio sensor according to the embodiment of the invention.
Figure 3:
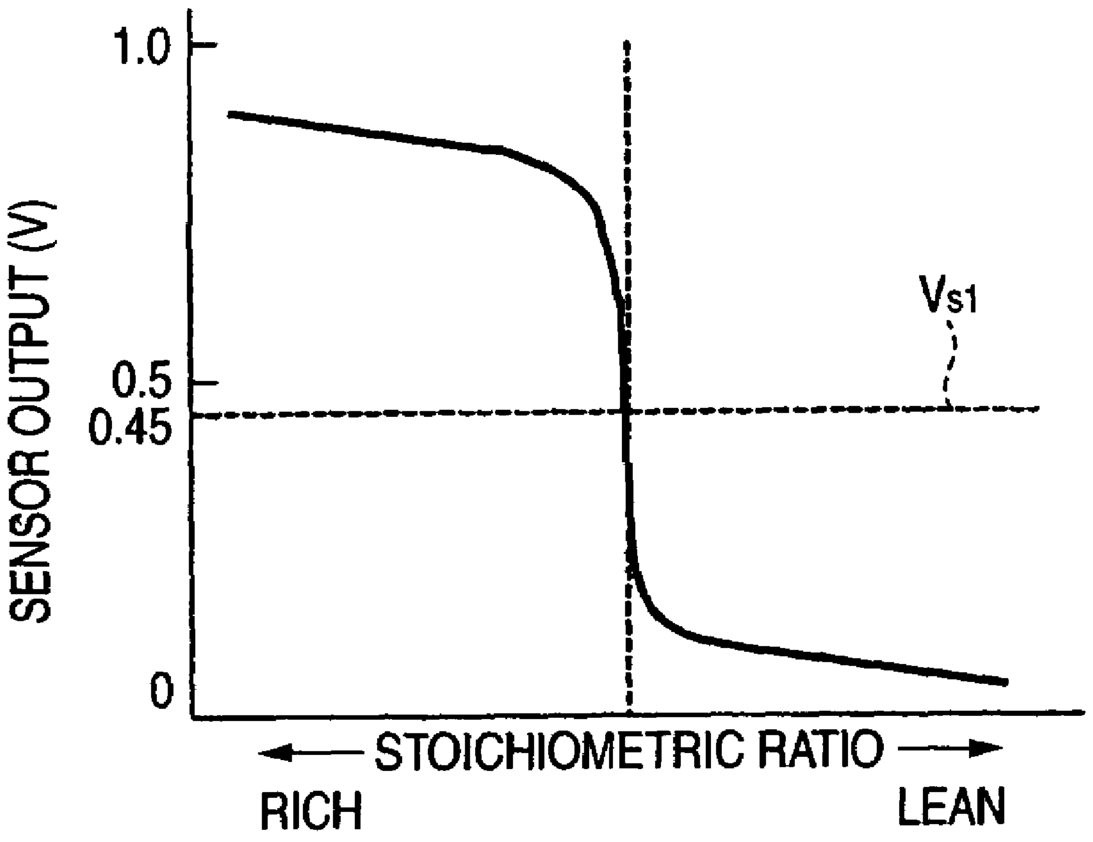
FIG. 3 is a graph showing a characteristic of an air-fuel ratio sensor.
Figure 4:
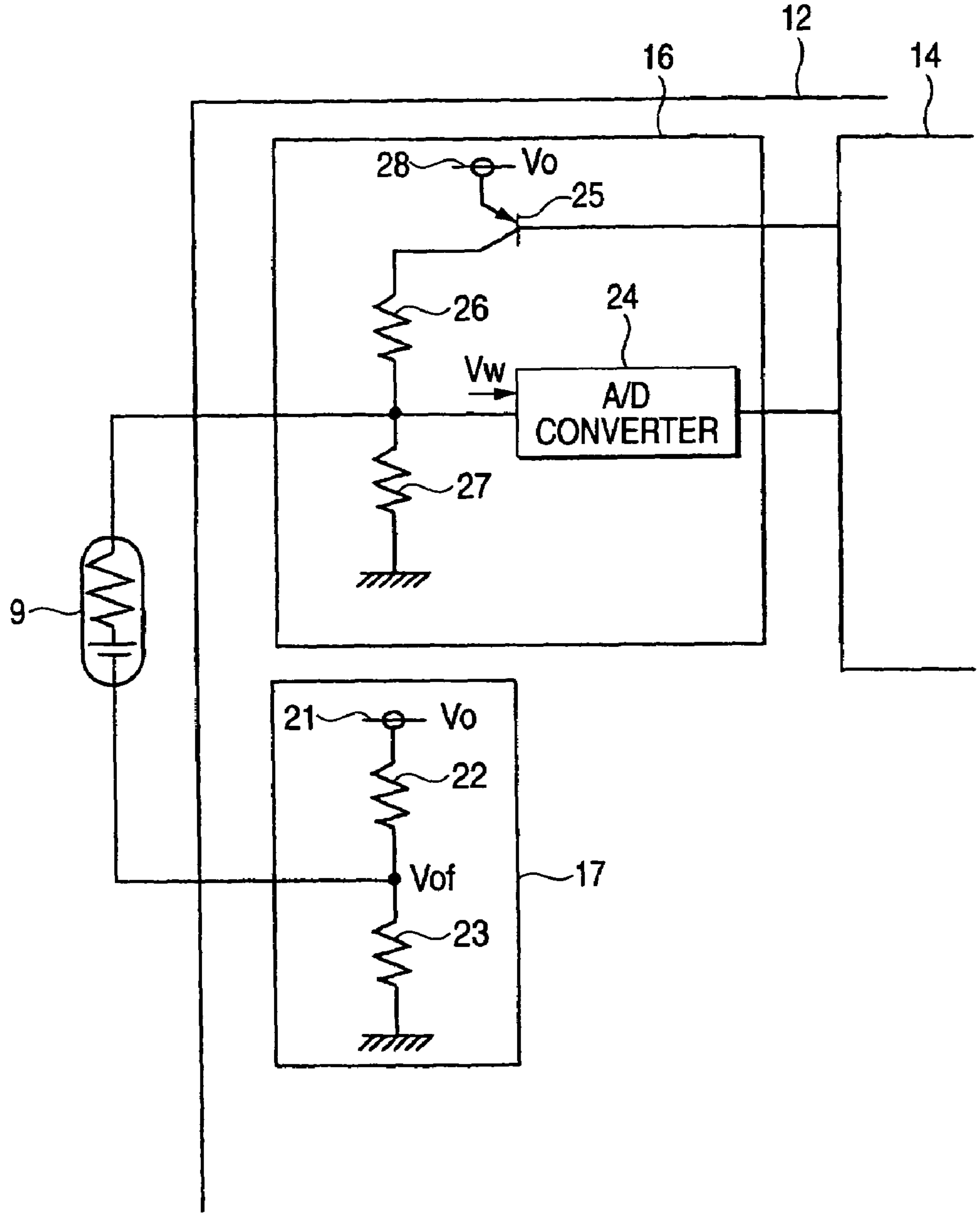
FIG. 4 is a circuit diagram showing a circuit configuration of an input unit of the failure diagnostic apparatus for an air-fuel ratio sensor according to the embodiment of the invention.
Figure 5:
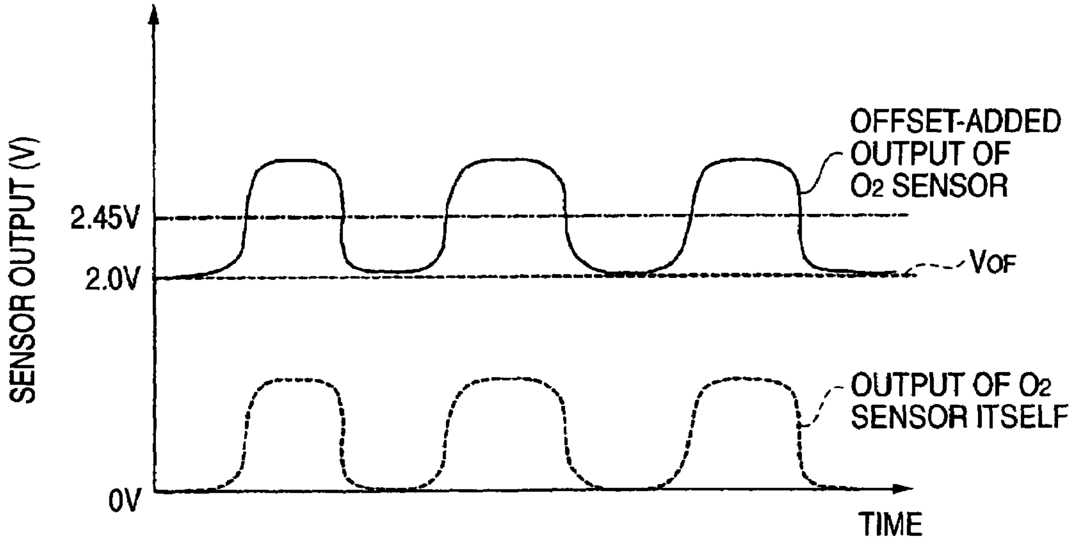
FIG. 5 is a graph showing an output voltage waveform of the air-fuel ratio sensor in the failure diagnostic apparatus for an air-fuel ratio sensor according to the embodiment of the invention.
Figure 6:
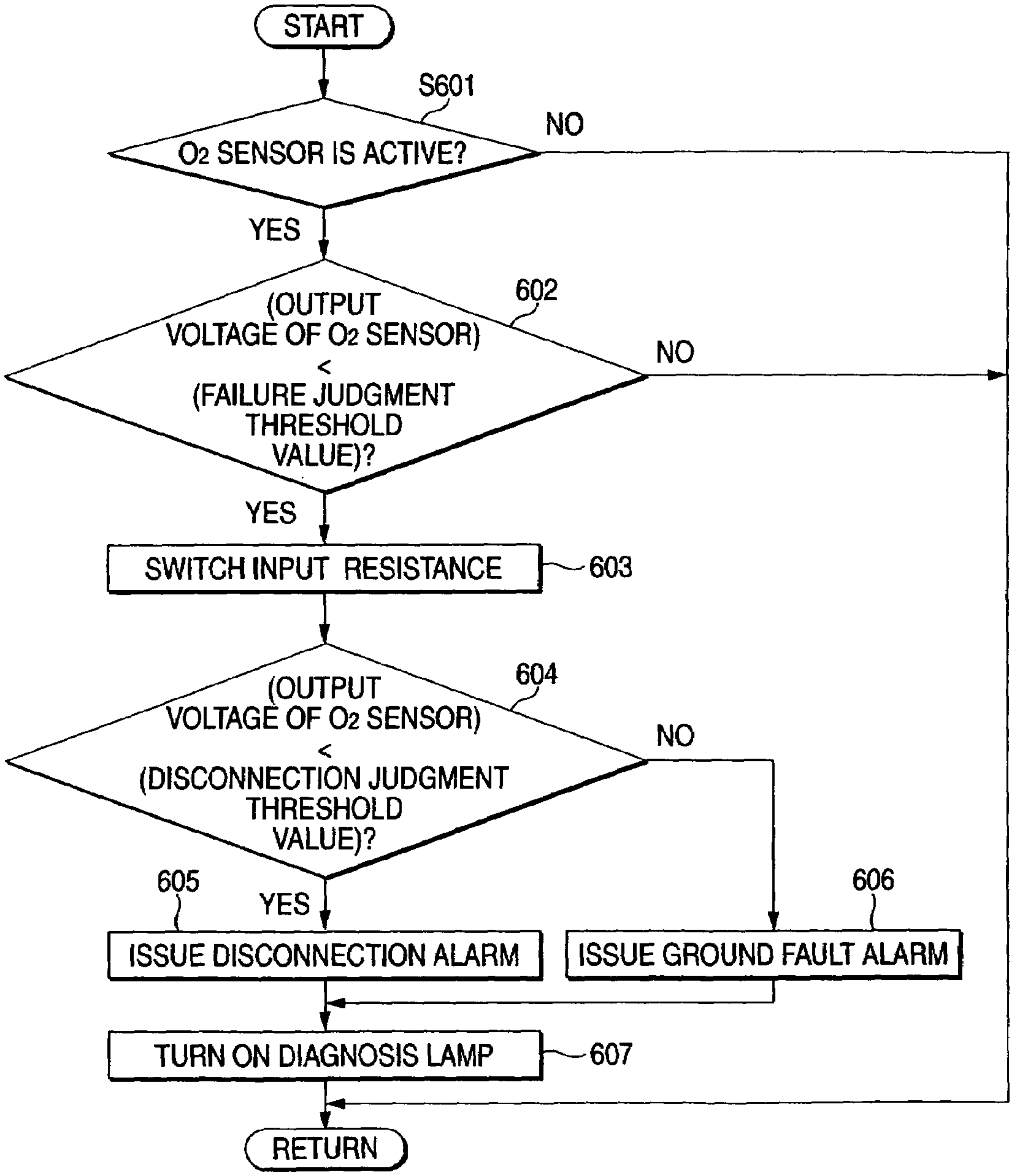
FIG. 6 is a flowchart showing the operation of the failure diagnostic apparatus for an air-fuel ratio sensor according to the embodiment of the invention.

A failure diagnostic apparatus and method for an air-fuel ratio sensor according to an embodiment of the present invention will be hereinafter described with reference to FIGS. 1-6. FIG. 1 schematically shows the entire configuration of an internal combustion engine. FIG. 2 is a functional block diagram of a control apparatus (i.e., a failure diagnostic apparatus for an air-fuel ratio sensor). FIG. 3 is a graph showing a characteristic of an air-fuel ratio sensor. FIG. 4 is a circuit diagram showing a circuit configuration of an input unit for the air-fuel ratio sensor. FIG. 5 is a graph showing examples of an output voltage of the air-fuel ratio sensor and an offset voltage. FIG. 6 is a flowchart showing the operation of the control apparatus.

As shown in FIG. 1, an intake pipe 2 that is part of an induction system of an internal combustion engine is provided, in downstream order, with an air cleaner 3, an air flow sensor (hereinafter abbreviated as AFS) 4 for outputting a signal corresponding to a suction air amount, a throttle valve 5, and a fuel injection valve 6. The part of the intake pipe 2 between the throttle valve 5 and the fuel injection valve 6 is formed with a surge tank 7. An exhaust pipe 8 of the internal combustion engine 1 is provided with an air-fuel ratio sensor 9 for measuring an air-fuel ratio from an oxygen concentration in exhaust gas. The internal combustion engine is also equipped with a crank angle sensor 10 for measuring a rotation speed and a rotation angle of the internal combustion engine and a water temperature sensor 11 for measuring a coolant temperature. Reference numeral 1 denotes a combustion chamber.

A suction air amount measured by the AFS 4, an output signal of the crank angle sensor 10, a signal of the air-fuel ratio sensor 9, and a temperature signal of the water temperature sensor 11 are input to a controller 12. The control apparatus 12 performs a fuel control in accordance with drive conditions by controlling the fuel injection valve 6 for each cylinder of the internal combustion engine on the basis of those input signals. Further, the control apparatus 12 makes a failure judgment by monitoring the air-fuel ratio sensor 9. If judging that a failure has occurred, the control apparatus 12 causes an alarm device 13 such as an alarm lamp to operate. To those ends, the control apparatus 12 has, in addition to a microprocessor 14, an output circuit 15 for the fuel injection valve 6, an input circuit 16 for the air-fuel ratio sensor 9, and an offset power circuit 17.

FIG. 2 shows a functional configuration of that part of the internal combustion engine which includes the control apparatus 12 and relates to a failure diagnosis for the air-fuel ratio sensor 9. As described above, the control apparatus 12 receives signals from the AFS 4, the crank angle sensor 10, and the water temperature sensor 11 and calculates a fuel injection amount suitable for drive conditions. Further, the control apparatus 12 determines a fuel injection amount through a feedback control taking a stoichiometric air-fuel ratio into consideration using a signal from the air-fuel ratio sensor 9. The output circuit 15 converts the determined fuel injection amount into a duty factor signal representing a drive time corresponding to the injection amount. The duty factor signal is supplied to the fuel injection valve 6.

The microprocessor 14 has a storing means 18 for storing input signals from various sensors and other information, a failure diagnosing means 19 for judging for a failure of the air-fuel ratio sensor 9 on the basis of the level of a signal supplied from the air-fuel ratio sensor 9, and an activation state judging means 20 for judging an activation state of the air-fuel ratio sensor 9. The failure diagnosing means 19 includes an input resistance switching means for switching the input resistance of the input circuit 16 (described later) and a failure state judging means for determining whether a failure of the air-fuel ratio sensor 9 is a disconnection or a ground fault on the basis of the level of an output signal of the air-fuel ratio sensor 9 in an input resistance switching period.

The air-fuel ratio sensor 9, which is to output a voltage corresponding to the ratio of an oxygen concentration of the atmosphere to that of exhaust gas, has a characteristic shown in FIG. 3. FIG. 3 shows how the output voltage of the air-fuel ratio sensor 9 varies with the oxygen concentration of exhaust gas when the air-fuel ratio is varied. The output voltage varies steeply around a stoichiometric air-fuel ratio, and the output voltage is high when the air-fuel ratio is on the rich side and is low when the air-fuel ratio is on the lean side. The output voltage is approximately equal to 0.45 V at the stoichiometric air-fuel ratio. This output voltage value 0.45 V is employed as a threshold level Vs1. The microprocessor 14 feedback-controls the fuel injection amount by judging that the air-fuel ratio is rich if the output voltage is higher than Vs1, and judging that the air-fuel ratio is lean if the output voltage is lower than Vs1.

The air-fuel ratio sensor 9 exhibits a very high internal resistance value when it is in an inactive state at ordinary temperature. As the air-fuel ratio sensor 9 is heated by exhausted combustion gas and thereby activated, its internal resistance decreases and the air-fuel ratio sensor 9 comes to produce a normal sensor output. The activation state judging means 20 of the microprocessor 14 judges whether the air-fuel ratio sensor 9 has been rendered active because of, for example, a lapse of time after a start of the internal combustion engine, and starts a feedback control after activation of the air-fuel ratio sensor 9. The failure diagnosing means 19 performs a failure judgment operation on the air-fuel ratio sensor 9 in a period when the air-fuel ratio sensor 9 is judged active.

FIG. 4 shows exemplary circuits of the input circuit 16 and the offset power circuit 17 that are shown in FIGS. 1 and 2. For example, the offset power circuit 17 is composed of a voltage source 21 such as a constant voltage source for the microprocessor 14 and voltage division resistors 22 and 23 for dividing a voltage Vo of the voltage source 21. A divisional voltage Vof produced by the voltage division resistors 22 and 23 is supplied to the ground side of the air-fuel ratio sensor 9 as an offset voltage, whereby an output signal of the air-fuel ratio sensor 9 is offset. The offset voltage Vof is set so as to be higher than a maximum output voltage of the air-fuel ratio sensor 9 itself and so that offset-added minimum and maximum output voltages of the air-fuel ratio sensor 9 become higher than 0 V by a prescribed voltage and lower than a maximum input voltage of an A/D converter 24 (described later), respectively. As such, the offset voltage Vof enables judgment of a type of failure of the air-fuel ratio sensor 9 as described later and also enables a feedback control using an offset-added signal.

The input circuit 16 is composed of the A/D converter 24 for A/D-converting an output signal of the air-fuel ratio sensor 9 and supplying a resulting digital signal to the microprocessor 14, a transistor 25 as a switching element, a resistor 26 that is connected between the collector of the transistor 25 and the input side of the A/D converter 24, and a resistor 27 that is connected between the input side of the A/D converter 24 and the ground. The emitter and the base of the transistor 25 is connected to a voltage source 28 and the microprocessor 14, respectively. With this configuration, an input resistance switching signal that is output from the failure diagnosing means 19 of the microprocessor 14 is supplied to the base of the transistor 25. The input resistance of the input circuit 16 as viewed from the air-fuel ratio sensor 9 is switched by turning on or off the transistor 25.

To detect an air-fuel ratio on the basis of an output signal of the air-fuel ratio sensor 9, the microprocessor 14 takes in an output signal of the air-fuel ratio sensor 9 via the A/D converter 24 when the transistor 25 is in an off-state. The input terminal of the A/D converter 24 is grounded via the resistor 27. However, since the resistance of the resistor 27 is set sufficiently larger than the input impedance of the air-fuel ratio sensor 9, at this time an output signal of the air-fuel ratio sensor 9 is input to the A/D converter 24 and then supplied to the microcomputer 14 without being influenced by the resistor 27.

To perform a failure diagnosis on the air-fuel ratio sensor 9 when an input resistance switching condition is satisfied, that is, the air-fuel ratio sensor 9 is active, the transistor 25 is turned on, whereby the voltage of the voltage source 28 is supplied to the input terminal of the A/D converter 24 via the resistor 26. If the output signal line of the air-fuel ratio sensor 9 is disconnected, an input voltage Vin of the A/D converter 24 is divided by the resistors 26 and 27. On the other hand, if a ground fault occurs in the output signal line of the air-fuel ratio sensor 9, the input voltage of the A/D converter 24 becomes equal to the ground voltage. The failure diagnosing means 19 of the microprocessor 14 reads the input voltage of the A/D converter 24 when outputting an input resistance switching signal. The failure diagnosing means 19 thereby judges whether the output signal lines of the air-fuel ratio sensor 9 is normal, disconnected, or in a ground fault state.

FIG. 5 shows output voltage waveforms of the air-fuel ratio sensor 9. The broken line in FIG. 5 represents an output voltage (a) that is obtained with no offset voltage. When the air-fuel ratio is varied repeatedly between lean and rich, the output voltage (a) reciprocates between 0 V and about 1 V as shown in FIG. 3. The solid line in FIG. 5 represents an output voltage (b) that is obtained by adding an offset voltage of 2 V to the output voltage (a). The output voltage (b) varies with about 2.45 V as the center. With no offset voltage, the output voltage of the air-fuel ratio sensor ($O_2$ sensor) 9 being active (i.e., the input voltage of the A/D converter 24) is equal to about 0 V when the air-fuel ratio is lean and about 1 V when the air-fuel ratio is rich. The input voltage of the A/D converter 24 is equal to 0 V irrespective of whether the air-fuel ratio sensor 9 is in an disconnection state or a ground fault state, and hence it is difficult to judge a failure type.

In contrast, with an offset voltage of 2 V, for example, as seen from the voltage waveform (b) in FIG. 5, the input voltage of the A/D converter 24 is equal to about 2 V when the air-fuel ratio is in a lean state and about 3 V when the air-fuel ratio is in a rich state. On the other hand, as described above, the input voltage of the A/D converter 24 is equal to a voltage obtained by dividing the voltage of the voltage source 28 by the resistors 26 and 27 if the air-fuel ratio sensor 9 is in a disconnection state, and is equal to about 0 V if the air-fuel ratio sensor 9 is in a ground fault state. Therefore, whether the air-fuel ratio sensor 9 is in an disconnection state or a ground fault state can be judged by setting respective judgment threshold values for the disconnection state and the ground fault state.

As described above, adding the offset voltage makes it possible to produce differences between a lean-state output voltage of the air-fuel ratio sensor 9 and disconnection-state and ground-fault-state input voltages of the A/D converter 24 and to thereby perform a failure judgment reliably. That is, a failure judgment can be performed reliably in a period when the activation state judging means 20 judges that the air-fuel ratio sensor 9 is active by setting the failure judgment threshold value of the failure diagnosing means 19 at 1.8 V, for example, in the case of FIG. 5. A failure diagnosis is always possible in a period when the active state judging means 20 judges that the air-fuel ratio sensor 9 is active, whereby a failure such as a disconnection or short-circuiting can detected early. Upon judging that the air-fuel ratio sensor 9 is in failure, the failure diagnosing means 19 causes the alarm device 13 to operate. A feedback control can be performed in the same manner as in the conventional case by using, as an air-fuel ratio, a value obtained by subtracting the offset voltage from an input voltage of the A/D converter 24.

Next, an entire operation will be described with reference to the flowchart of FIG. 6. After the internal combustion engine and hence the routine has been started, at step 601 the activation state judging means 20 judges an activation state of the air-fuel ratio sensor 9. It is judged that the air-fuel ratio sensor 9 is active if, for example, the elapsed time from the start has exceeded a prescribed time. If the air-fuel ratio sensor 9 is not active, the execution of the routine is finished and a return is made to the start. This is repeated until the air-fuel ratio sensor 9 becomes active. If it is judged that the air-fuel ratio sensor 9 is active because of a lapse of the prescribed time, the routine goes to step 602, where the failure diagnosing means 19 judges whether the output voltage of the air-fuel ratio sensor 9 is lower than the failure judgment threshold value.

If it is judged at step 602 that the output voltage of the air-fuel ratio sensor 9 is not lower than the failure judgment threshold value, the execution of the routine is finished and a return is made to the start. If the output voltage of the air-fuel ratio sensor 9 is lower than the failure judgment threshold value, the routine goes to step 603, where the failure diagnosing means 19 switches the input resistance by turning on the transistor 25. At step 604, the failure diagnosing means 19 reads an output voltage of the air-fuel ratio sensor 9 (i.e., an input voltage of the A/D converter 24) in a state that the transistor is on, and judges whether the thus-read voltage is within a disconnection failure range or a ground fault range.

As described above, where the output voltage of the air-fuel ratio sensor 9 is in the range of 0 V to about 1 V and the offset voltage is 2 V, the input voltage of the A/D converter 24 ranges from 2 V to 3 V in a normal state. Therefore, the resistance values of the resistors 26 and 27 may be set so that the input voltage of the A/D converter 24 becomes lower than 1.8 V in the event of a disconnection, 1.8 V serving as a failure judgment threshold value. The input voltage of the A/D converter 24 becomes 0 V in the event of a ground fault, and hence 0.2 V may be set as another failure judgment threshold value. With these settings, whether the voltage read at step 604 is in the disconnection failure range or the ground fault range can be judged. If it is judged at step 604 that a disconnection failure has occurred, at step 605 the alarm device 13 issues a disconnection alarm. If it is judged that a ground fault has occurred, at step 606 the alarm device 13 issues a ground fault alarm. At step 607, a diagnosis lamp is turned on.

As described above, the ground-side voltage of the air-fuel ratio sensor 9 is offset. While the air-fuel ratio sensor 9 is active, switching is made between a state that a voltage is supplied from the voltage source 28 via the resistors 26 and 27 to the input terminal of the A/D converter 24 that is connected to the air-fuel ratio sensor 9 and a state that the voltage is not supplied to the input terminal of the A/D converter 24. The voltage supplied from the voltage source 28 is set lower than the minimum value of the offset-added output voltage of the air-fuel ratio sensor 9. With these measures, a failure diagnosis can be performed continuously while discrimination is made between a disconnection and a ground fault of the air-fuel ratio sensor 9. Since a failure diagnosis can always be performed while the air-fuel ratio sensor 9 is active, which enables early detection of a failure.

It is also necessary that the offset voltage be higher than the maximum output voltage of the air-fuel ratio sensor 9 itself by a prescribed value and that the offset-added maximum output voltage of the air-fuel ratio sensor 9 be lower than the maximum allowable input voltage of the A/D converter 24. These settings make it possible to perform a failure diagnosis continuously while the air-fuel ratio is feedback-controlled on the basis of the output signal of the air-fuel ratio sensor 9, which enables early detection of a failure merely by adding simple circuits.

What is claimed is:

1. A failure diagnostic apparatus for an air-fuel ratio sensor, comprising:

an air-fuel ratio sensor attached to an exhaust pipe of an internal combustion engine configured to detect an air-fuel ratio from an oxygen concentration of exhaust gas;

an offset power source configured to offset a ground-side voltage of the air-fuel ratio sensor;

means for judging whether the air-fuel ratio sensor is active;

means for judging for a failure from an offset-added output signal of the air-fuel ratio sensor in a period when the means for judging whether the air-fuel ratio sensor is active judges that the air-fuel ratio sensor is active;

means for switching a level of an input signal from the air-fuel ratio sensor when the means for judging for the failure has detected a failure in the air-fuel ratio sensor; and means for inputting the input signal from the air-fuel ratio sensor through an A/D converter and determining whether the air-fuel ratio sensor is in a disconnection state or a ground fault state on the basis of a voltage level obtained when the means for switching a level of the input signal has switched the input signal level;

wherein an offset voltage of the offset power source is set higher than a maximum output voltage of the air-fuel ratio sensor and a maximum offset-added output voltage of the air-fuel ratio sensor is set lower than a maximum allowable input voltage of the A/D converter.

2. The failure diagnostic apparatus for an air-fuel ratio sensor according to claim 1, further comprising an alarm device configured to announce an occurrence of an abnormality or an abnormality condition when the means for judging for the failure or the means for determining whether the air-fuel ratio sensor is in a disconnection state or a ground fault state has detected a failure in the air-fuel ratio sensor.

3. The failure diagnostic apparatus according to claim 1, wherein said type of failure of the air-fuel ratio sensor comprises one of a disconnection state or a ground fault.

4. The failure diagnostic apparatus according to claim 1, wherein the means for switching a level of the input signal switches the input signal level by switching an input resistance of an input circuit as viewed from the air-fuel ratio sensor.

5. The failure diagnostic apparatus according to claim 4, wherein the input circuit includes the A/D converter.

6. The failure diagnostic apparatus according to claim 5, wherein the input circuit further includes a transistor, a first resistor connected between the transistor and the A/D converter, and a second resistor connected between the A/D converter and ground, and wherein the first and second resistors are also connected to the air-fuel ratio sensor.

* * * * *